United States Patent

Perlman

[15] 3,644,918

[45] Feb. 22, 1972

[54] INTEGRATING CIRCUIT USING A PROGRAMMABLE UNIJUNCTION TRANSISTOR

[72] Inventor: David E. Perlman, Rochester, N.Y.

[73] Assignee: Detection Systems Inc., Rochester, N.Y.

[22] Filed: Dec. 16, 1969

[21] Appl. No.: 885,567

[52] U.S. Cl. ............................340/276, 307/252 F, 307/255, 307/301, 328/127

[51] Int. Cl. ....................................H03k 17/28, H03k 5/159

[58] Field of Search ...............307/252 F, 301, 229, 234, 255, 307/293, 252; 328/127; 340/276, 258

[56] References Cited

UNITED STATES PATENTS

| | | | |
|---|---|---|---|
| 3,111,657 | 11/1963 | Bagno | 340/258 |
| 3,160,766 | 12/1964 | Reymond | 307/255 |
| 3,309,688 | 3/1967 | Yanishevsky | 307/234 X |
| 3,380,003 | 4/1968 | Bemmann | 307/301 X |
| 3,470,495 | 9/1969 | Deboo | 328/127 X |

OTHER PUBLICATIONS

W. R. Spofford, Jr., The D13T- A Programmable Unijunction Transistor, GE Application Note, 11/1967, pg. 1- 14.

*Primary Examiner*—Donald J. Yusko
*Assistant Examiner*—Scott F. Partridge
*Attorney*—Warren W. Kurz

[57] ABSTRACT

A unique integrating circuit adapted for use in condition-responsive systems for preventing false alarming due to a series of rapidly occurring transient signals. A programmable unijunction transistor is used to rapidly discharge the capacitive element of the integrator in response to a slight decrease in input signal.

2 Claims, 5 Drawing Figures

INVENTOR
DAVID E. PERLMAN

Warren W. Kurz

INTEGRATING CIRCUIT USING A PROGRAMMABLE UNIJUNCTION TRANSISTOR

CROSS-REFERENCE TO RELATED APPLICATIONS

Reference is made to the commonly assigned copending U.S. Pat. application, Ser. No. 858,927, filed Sept. 18, 1969 in the name of David E. Perlman and entitled "Improved Single Terminal Electric Eye."

BACKGROUND OF THE INVENTION

1. Field of the Invention

The present invention relates to improvements in condition-responsive systems, such as intruder detection systems and the like. More particularly, this invention relates to certain improvements in control circuits adapted for use in such systems.

2. Description of the Prior Art

To lessen the likelihood of false alarming in condition-responsive systems, it is common to integrate the output of the condition-sensing component via a simple RC integrating network. By arranging the alarm component in parallel with the capacitive element of the integrator, and by selecting a relatively high triggering threshold for the alarm component, high-amplitude transients, or other high-amplitude spurious signals of too short duration to be considered attributable to a change in the condition being monitored by such system, may be prevented from triggering the alarm component.

Ideally, an integrating circuit used for the aforedescribed purpose should respond very slowly to sudden increases in input, and substantially instantaneously to sudden decreases. That is to say, the capacitive element should charge at a slow rate in response to increases in input and discharge substantially instantaneously in response to decreases in input. Such a response would thus permit suppression of the high amplitude of a transient input signal for a predetermined time, yet permit the integrator to reset to zero volts output immediately following the cessation of each transient signal. Thus, the integrator could operate at maximum efficiency in discriminating against transients or spurious input signals, notwithstanding the frequency of occurrence.

However, a characteristic of conventional RC integrators is that the response time or decay rate immediately following the cessation of a high-amplitude transient signal is not instantaneous and, in fact, may be as long or longer than the initial charge rate. This characteristic can lead to false alarm problems in condition-responsive systems whenever there is a possibility that a rapid succession of transients could appear on the output of the condition-sensing component. If, for example, a second transient occurs before the charge on the capacitive element of the integrator has decayed to zero volts, the capacitor will begin to charge from the charge level present on the capacitor at the time the second transient occurred. As is apparent, the capacitor could gradually accumulate charge by a series of rapidly occurring transients, each time charging from a higher level, and, once the alarm component triggering threshold is exceeded, a false alarm will be generated.

Heretofore, it has been common to solve the aforedescribed problem by utilizing a diode arranged in parallel with the resistive element of the integrator. The diode is commonly arranged with the cathode toward the input of the integrator. By this arrangement, the capacitive element of the integrator may discharge at a much faster rate than that at which it charges, the charging path being through the resistive element and the discharging path through the diode to ground. But this arrangement suffers the major drawback of being practical only when the impedance of the condition-sensing component which feeds the integrator is small relative to the resistive element of the integrator. Otherwise, the discharging time will be substantial, due to the effect of impedance of the condition-sensing component on the time constant of the integrating circuit.

SUMMARY OF THE INVENTION

Accordingly, among the important objects of the present invention is the provision of an improved control circuit for use in condition-responsive alarm systems whereby false alarms generated by a series of transients occurring in rapid succession may be avoided.

In accordance with the invention, a conventional RC integrating circuit is provided with means for rapidly discharging the capacitive element, regardless of the value of the input impedance, whenever the input voltage to the integrating circuit decreases slightly below the voltage stored on the capacitive element. According to a preferred embodiment of the invention, a programmable unijunction transistor (PUT) is arranged with its anode and cathode leads connected across the capacitive element of the integrator and with the gate and anode leads connected across the resistive element. Because of those characteristics of the PUT which cause it to switch into a high conduction state whenever the gate lead goes negative with respect to its anode lead by more than a few tenths of a volt, the PUT is capable of discharging the capacitor at an extremely high rate, whenever the voltage across the integrator input drops slightly below the voltage across its output. Since such a drop will occur following each transient pulse, the voltage on the capacitive element will be unable to build up to a level sufficient to cause false alarming.

In accordance with an alternate embodiment of the invention, PNP- and NPN-transistors are substituted for the PUT of the preferred embodiment and are so arranged in circuit with a conventional RC integrator as to provide substantially the same discharge rate as afforded by a PUT whenever the voltage across the integrator input drops a predetermined amount below the output voltage.

Other objects and advantages of the invention will become immediately apparent to those skilled in the art from the ensuing detailed description, reference being made to the accompanying drawings.

DESCRIPTION OF THE PREFERRED EMBODIMENTS

Figure 1:
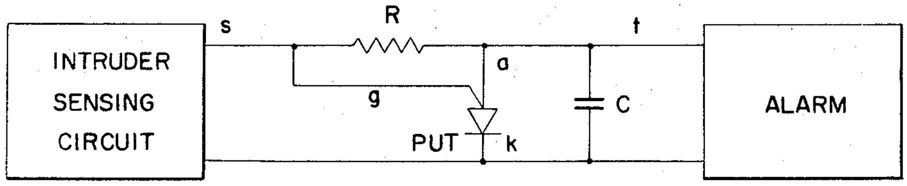
FIG. 1 is an electrical schematic diagram of a circuit comprising a preferred embodiment of the invention.

Referring now to FIG. 1, an improved integrating circuit in accordance with a preferred embodiment of the invention is shown coupling a relay operated alarm mechanism with the output s of an intruder sensing circuit, such as disclosed in my commonly assigned copending application, Ser. No. 858,927, filed on Sept. 18, 1969 and entitled "Improved Single Terminal Electric Eye." The integrating circuit comprises resistor R, capacitor C and a programmable unijunction transistor or "PUT." As shown, gate *g* and anode *a* of the PUT are connected across resistor R, and capacitor C is connected between the PUT anode *a* and cathode *k*. The characteristics of the PUT are such that it will act substantially as a closed switch whenever the voltage on gate *g* is slightly less than the voltage on anode *a*. At all other times, the PUT acts substantially as an open switch. Thus, whenever output *s* is positive going, thereby causing the voltage on gate *g* to exceed that an anode *a*, the PUT will have an insignificant effect on the charging time of capacitor C, since the PUT acts substantially as an open switch. When, however, output *s* is negative going, the PUT will rapidly switch to a high conduction state, after the gate voltage drops a predetermined amount below the anode voltage, such amount being of the order of a few tenths of a volt, depending upon the characteristics of the anode-gate junction of the PUT. When the PUT is in a high conduction state, the charge on capacitor C is, in effect, instantaneously short circuited to ground. The PUT, being regenerative, will remain in a high conduction state until the charge on capacitor C has dissipated, thereby causing the voltage between anode and cathode to approach zero, at which time the PUT will switch to its normal low conduction state.

Figure 2A:
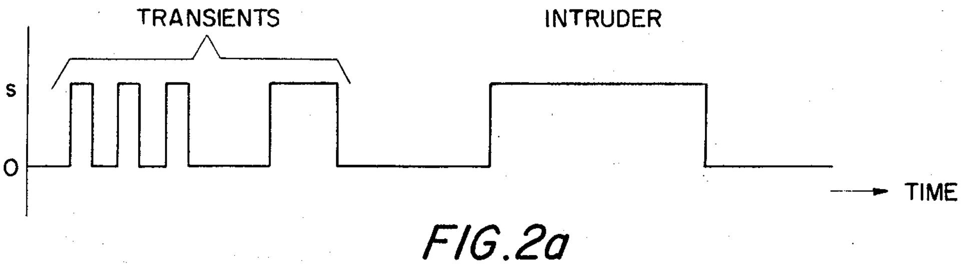
FIGS. 2*a*–2*c* are graphs comparing the output voltage of a conventional integrating circuit with that of the circuit comprising a preferred embodiment of the invention for a hypothetical input voltage.
Figure 2B:
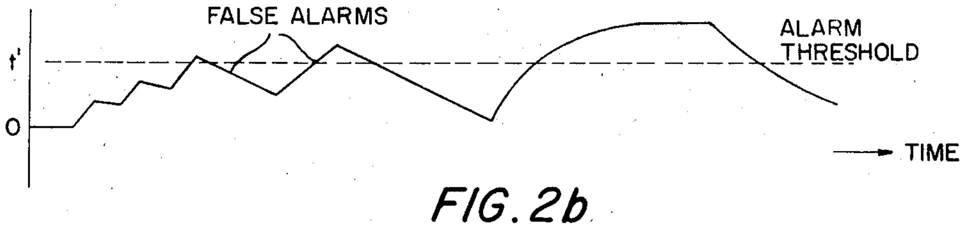
Figure 2C:
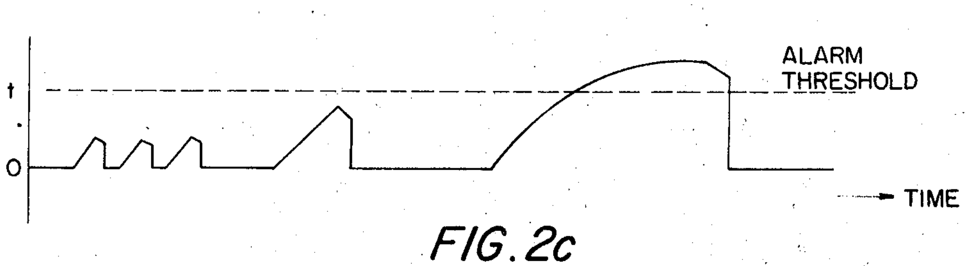

To exemplify the advantage derived from using the above-described integrating circuit in condition-responsive systems, such as intruder detection systems, reference is made to FIGS. 2*a*–2*c*. In FIG. 2*a*, a hypothetical output *s* of the condition-sensing circuit of FIG. 1 is presented. Output *s* is shown to consist of a series of transients or signals of too short duration to be considered attributable to a change in the condition being monitored, followed by a signal which is of such duration as to be considered attributable to such a change; e.g., the change in radiation level incident on the photocell of an electric eye which is caused by the presence of an intruder in the beam path. The typical response *t'* of a conventional RC integrator (e.g., the circuit of FIG. 1 absent the PUT) to signals of the type presented in FIG. 2*a* is depicted in FIG. 2*b*. As is apparent, when transients occur in such rapid succession as not to afford the capacitive element the opportunity to completely discharge between successive transients, the capacitive element will gradually accumulate a charge. When the charge accumulates beyond the alarm threshold, the alarm relay will trigger and a false alarm will be generated.

In FIG. 2*c*, the output *t* of the integrating circuit depicted in FIG. 1 is shown for the various inputs presented in FIG. 2*a*. Although the response to an increase in input is substantially identical to that of the conventional RC integrator, the response to a decrease in input is significantly different from that of the conventional circuit, the response of the FIG. 1 circuit exhibiting a substantially instantaneous decrease in output voltage to zero volts whenever the input voltage drops a few tenths of a volt below the output voltage. Thus, rapidly occurring transients of the type shown in FIG. 2*a* may be discriminated from signals which are likely generated by a change in the condition of interest.

Figure 3:
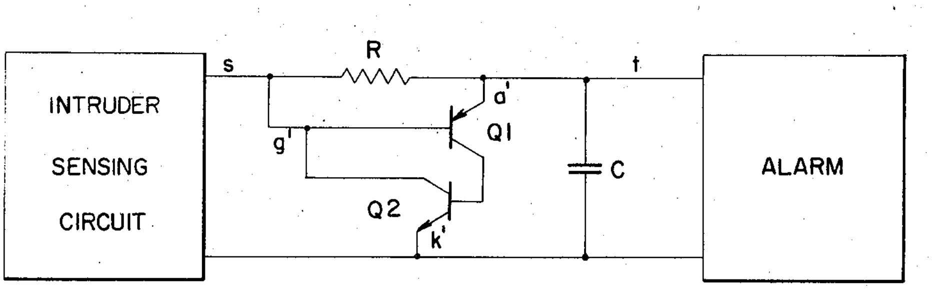
FIG. 3 is an electrical schematic diagram of a circuit comprising an alternate embodiment of the invention.

In FIG. 3, an equivalent circuit to that of FIG. 1 is shown using conventional PNP- and NPN-transistors Q1 and Q2, respectively. As shown, the base and collector leads of Q1 are connected with the collector and base leads, respectively, of Q2. The free leads, the emitter lead of Q1 and the emitter lead of Q2 have been designated *a'* and *k'*, respectively, for easy comparison with the FIG. 1 circuit. If, initially, base *g'* of Q1 is positive with respect to the emitter *a'* of Q1, or at the same potential, or open circuited then both Q1 and Q2 are nonconducting. If, however, the base voltage drops sufficiently to cause current B1 to flow from the emitter to the base of Q1, then Q1 will conduct with a collector current equal to $A_1I_{B1}$, where $A_1$ is the gain of Q1. Note, this current provides an input to Q2, whose collector current will then be $A_2(A_1I_{B1})$, where $A_2$ is the gain of $Q_2$. This current, in turn, serves as an additional input to Q1. If the product of $A_1A_2$ is larger than unity (as it will be as soon as the collector currents exceed a critical level) then the transistors regeneratively switch to a high conduction state and remain in such state even if the gate lead *g'* is opened. From the foregoing, it is readily apparent that transistors Q1 and Q2, arranged as shown, perform in the same manner as the PUT in the circuit shown in FIG. 1.

Although this invention has been described with particular reference to preferred embodiments thereof, it will be understood that variations and modifications can be effected within the spirit and scope of the invention as described hereinabove and as defined in the appended claims.

What is claimed is:

1. A condition-responsive system for monitoring a normally stable condition for changes therein, said system comprising:
   - a condition-sensing circuit capable of providing an output in response to a change in said normally stable condition;
   - an alarm component having an input and being actuateable in response to an electrical signal in excess of a predetermined level appearing on said input; and
   - an integrating circuit having an input connected with the output of said condition-sensing circuit and an output connected with the input to said alarm component, said integrating circuit comprising a resistive element, a capacitive element which is chargeable by the output of said condition-sensing circuit, and a programmable unijunction transistor arranged with the gate and anode leads thereof connected across said resistive element and with the anode and cathode leads thereof connected across said capacitive element.

2. A condition-responsive system for monitoring a normally stable condition for changes therein, said system comprising:
   - a condition-sensing circuit capable of providing an output in response to a change in said normally stable condition;
   - an alarm component having an input and being actuateable in response to an electrical signal in excess of a predetermined level appearing on said input; and
   - an integrating circuit connecting the output of said condition-sensing circuit with the input of said alarm component, said integrating circuit comprising resistive and capacitive elements, a PNP-transistor, and an NPN-transistor, said PNP-transistor having its base and collector leads connected with the collector and base leads, respectively, of said NPN-transistor, said transistors being arranged in said integrating circuit with the base and emitter leads of said PNP-transistor connected across said resistive element, and with the emitter leads of both transistors connected across said capacitive element.

* * * * *